(12) United States Patent
Saito

(10) Patent No.: US 7,463,429 B2
(45) Date of Patent: Dec. 9, 2008

(54) OPTICAL APPARATUS

(75) Inventor: Shinichiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/027,511

(22) Filed: Feb. 7, 2008

(65) Prior Publication Data
US 2008/0198479 A1    Aug. 21, 2008

(30) Foreign Application Priority Data
Feb. 15, 2007    (JP)    ............... 2007-035506

(51) Int. Cl.
*G02B 15/14* (2006.01)
(52) U.S. Cl. ...................... 359/694; 359/698
(58) Field of Classification Search ................. 359/694, 359/698
See application file for complete search history.

(56) References Cited
U.S. PATENT DOCUMENTS
7,236,305 B2 *    6/2007    Yakita .................. 359/675

FOREIGN PATENT DOCUMENTS
| JP | 04-134307 | 5/1992 |
| JP | 04-134308 | 5/1992 |
| JP | 06-205267 | 7/1994 |

\* cited by examiner

*Primary Examiner*—Scott J Sugarman
(74) *Attorney, Agent, or Firm*—Morgan & Finnegan LLP

(57) ABSTRACT

An optical apparatus includes an optical system including first and second movable lens units independently movable in an optical axis direction, and a controller causing the first movable lens unit to wobble in the optical axis direction based on contrast information. The optical system satisfies |tk/L|<15, where tk represents a distance from an image plane position to an exit pupil position when the exit pupil position is closest to the image plane position, L represents an effective diagonal length of an image at the image plane position. The controller causes the second movable lens unit to wobble in the optical axis direction to reduce variation of the position of the exit pupil in association with the wobbling of the first movable lens unit. The apparatus is capable of suppressing image twitching while obtaining a high focusing performance.

7 Claims, 12 Drawing Sheets

SPOT DIAGRAM
LIGHT INTENSITY
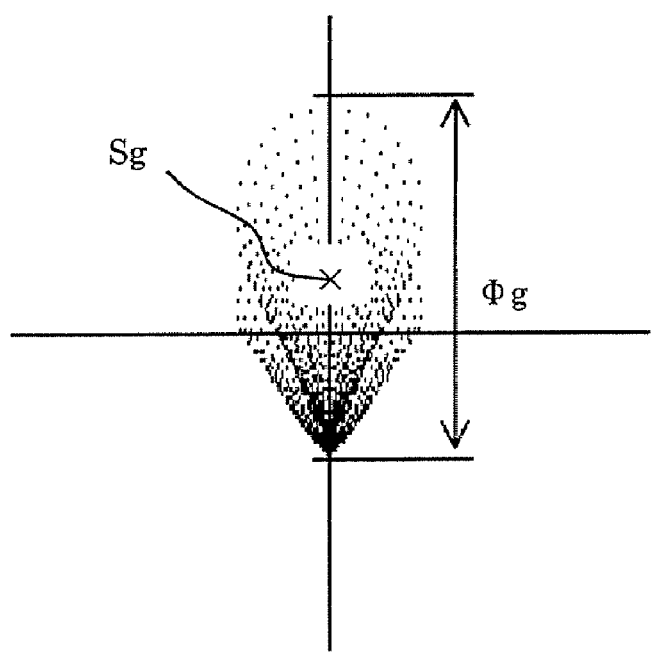
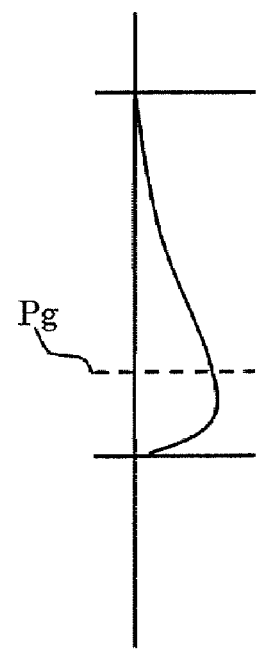
FIG. 2A
FIG. 2B

OPTICAL APPARATUS

BACKGROUND OF THE INVENTION

The present invention relates to an optical apparatus such as a digital still camera, a digital video camera and an interchangeable lens, and particularly to autofocusing (AF) control in the optical apparatus.

Optical apparatuses using a solid-state image-pickup element often employ a so-called contrast AF (TV-AF) in which a focus lens (or a compensator) is moved by using contrast information generated from video signals to obtain an in-focus state.

In addition, such optical apparatuses often employ a zoom optical system of an inner-focus type in which the focus lens (or the compensator) is driven when a variator that is a magnification-varying lens is moved while maintaining a certain optical positional relationship between the focus lens and the variator. Japanese Patent Laid-Open Nos. 4-134307 and 4-134308 disclose such an inner-focus type zoom optical apparatus.

In the contrast AF, changes of the contrast value (value relating to the contrast information) are detected by causing the focus lens to minutely wobble (minutely move to and fro) to determine the direction of an in-focus position in which the contrast value increases, and then the focus lens is moved in the determined direction.

Further, when the contrast value increases and decreases near the maximum level in response to the minute wobbling (minute to-and-fro motion), the position near the center of the wobbling is determined as the in-focus position.

When a back focus of an image-pickup optical system is shortened to reduce the size of the image-pickup optical system in response to a recent demand of miniaturization of the optical apparatus, it is difficult to keep an exit pupil of the image-pickup optical system sufficiently far from an image plane, so that the image-pickup optical system tends to become a non-telecentric optical system.

The minute wobbling in such an image-pickup optical system varies an image magnification, which causes a user to feel anomalous.

Japanese Patent Laid-Open No. 6-205267 discloses an optical apparatus in which the variator is wobbled in association with the wobbling of the compensator to reduce user's discomfort caused by variation of the image magnification.

However, the optical system disclosed in Japanese Patent Laid-Open No. 6-205267 which is a rear-focus type is a near-telecentric optical system, so that the variation of the image magnification caused by the motion of the focus lens (or the compensator) is small. Therefore, twitching of the image is almost unnoticeable even without causing the variator to wobble with the wobbling of the focus lens.

In contrast, in a zoom lens that is a non-telecentric optical system (that is, a zoom lens whose exit pupil position is varied with zooming), the wobbling of the focus lens (or the compensator) causes the image magnification to significantly vary, which may give discomfort to the user.

SUMMARY OF THE INVENTION

The present invention provides an optical apparatus capable of suppressing the twitching of the image while obtaining a high focusing performance of an image-pickup optical system that is a non-telecentric optical system (in other words, an image-pickup optical system whose exit pupil position is varied with zooming).

According to an aspect, the present invention provides an optical apparatus including an optical system including a first movable lens unit and a second movable lens unit that are independently movable in an optical axis direction, and a controller causing the first movable lens unit to wobble in the optical axis direction based on contrast information generated from an image signal for obtaining information relating to an in-focus position.

The optical system satisfies the following condition:

$$|tk/L|<15$$

where tk represents a distance from a position of an image plane of the optical system to a position of an exit pupil thereof when the position of the exit pupil is closest to the position of the image plane, L represents an effective diagonal length of an image at the position of the image plane.

The controller causes the second movable lens unit to wobble in the optical axis direction to reduce variation of the position of the exit pupil in association with the wobbling of the first movable lens unit.

Other aspects of the present invention will become apparent from the following description and the attached drawings.

BRIEF DESCRIPTION OF THE DRAWINGS

FIG. 2A is a figure showing a spot diagram for explaining a method to evaluate image twitching and field angle variation.

FIG. 2B is a figure showing light intensity for explaining a method to evaluate image twitching and field angle variation.

DESCRIPTION OF THE EMBODIMENTS

Exemplary embodiments of the present invention will hereinafter be described with reference to the accompanying drawings.

The present embodiment shows an optical apparatus capable of performing AF (autofocusing) of an optical system in which a positional sensitivity of a focus lens is small when recording a moving image. In other words, the embodiment enables the AF and the moving image recording in an optical system in which it is conventionally difficult to record the moving image while performing AF.

A variable magnification optical system (zoom optical system) of the embodiment will hereinafter be described with reference to the drawings.

In the contrast AF, changes of a contrast value (also called as a focus signal, an AF evaluation value signal or contrast information) are detected by causing a focus lens to minutely wobble (that is, to minutely move to and fro) to determine a direction of an in-focus position.

Then, the direction in which the contrast value increases is determined as the direction of the in-focus position (hereinafter referred to as the in-focus direction) and the focus lens is moved in the determined direction. Further, when the contrast value increases and decreases near the maximum level in response to the minute wobbling, the position near the center of the wobbling is determined as the in-focus position.

Figure 1:
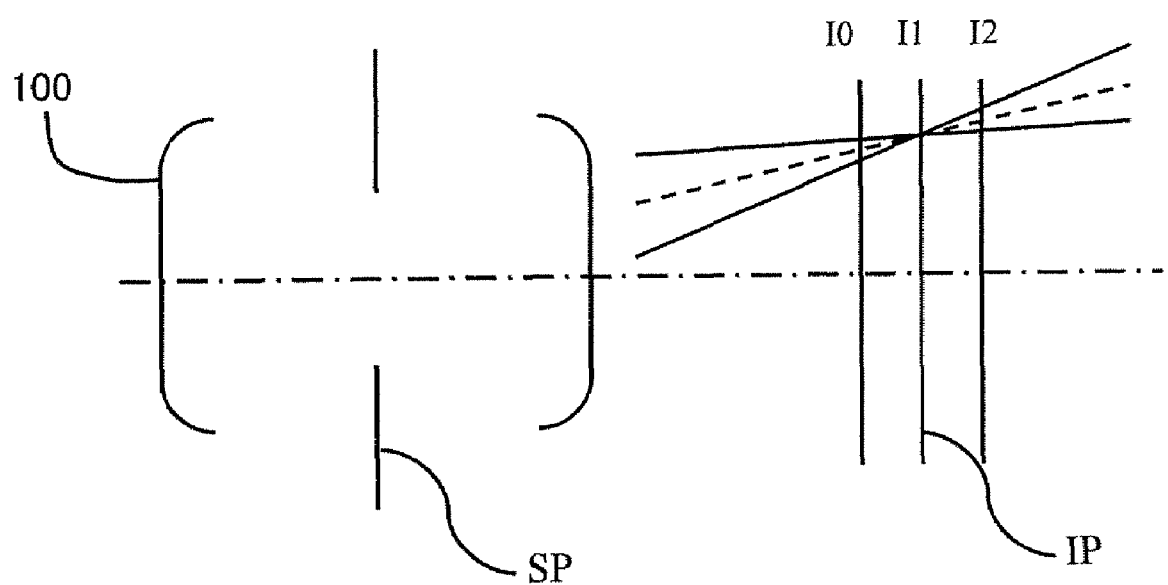
FIG. 1 is a figure showing variations of an image position and an image size in association with motion of a compensator or a focus lens.

As shown in FIG. 1, when using a zoom optical system (variable magnification optical system) 100 that is not a telecentric optical system as an image-pickup optical system, an image position and an image size on an image plane IP are slightly changed in association with motion of a compensator (that is, motion of a compensator comes along with changes of an image position and an image size on an image plane) that is a correcting lens or a focus lens that is a focus-adjusting lens.

For example, when the compensator or the focus lens is moved such that an image-forming position for a certain object point is moved from I0 to I1, I2 and then to I1 and thereby the contrast value becomes the maximum (that is, the value based on the contrast information becomes the extremal value), the image position and image size on the image plane IP are changed and thereby the field angle is varied. Such a quick and minute variation of the field angle gives the user an impression that the image is twitched (or twitching (flicker) of the image is occurred), which may give discomfort to the user.

In FIG. 1, SP denotes an aperture stop.

Such changes of the image position and image size caused by the minute wobbling of the compensator or the focus lens in the contrast AF generates a noticeable twitching of the image (the twitching of the image is hereinafter referred to as the image twitching) and a noticeable variation of a field angle (the variation of the field angle is hereinafter referred to as the field angle variation). In FIG. 1, SP denotes an aperture stop.

This problem is caused by variation of an exit pupil position of the image-pickup optical system in association with the minute wobbling of a first movable lens unit that is one of the compensator and the focus lens. The variation of the exit pupil position can be also called as the variation of an image magnification.

Therefore, in this embodiment, a second movable lens unit that is the other one of the compensator and the focus lens or a variator is minutely wobbled in association with the minute wobbling of the first movable lens unit so as to reduce the variations of the exit pupil position, thereby reducing the image twitching and the field angle variation.

Zoom optical systems that are not a telecentric optical system (hereinafter referred to as a non-telecentric optical system) can be classified as follows:

1) an optical system capable of reducing the image twitching and the field angle variation by simply setting a wobbling amount (amplitude) of the first movable lens unit and that of the second movable lens unit equal to each other;

2) an optical system capable of reducing the image twitching and the field angle variation by keeping a ratio of the wobbling amount of the first movable lens unit and that of the second movable lens unit fixed; and 3) an optical system capable of reducing the image twitching and the field angle variation by changing a ratio (relative ratio) of the wobbling amount of the first movable lens unit and that of the second movable lens unit according to a zoom position (zoom state).

Therefore, adequate evaluations according to these classifications of the optical system are required.

The evaluation methods of the image twitching and the field angle variation in this embodiment are as follows:

1) a method using the movement of an area centroid of an image out of focus by a predetermined amount; and 2) a method using the movement of a light-intensity centroid of an image out of focus by a predetermined amount.

These two evaluation methods will be described with reference to FIG. 1 and a spot diagram shown in FIG. 2A.

The image size is given by a diameter Dg of the spot diagram shown in FIG. 2A. The diameter $\Phi g$ is changed with the minute wobbling in the AF.

The variations of the exit pupil position and the image magnification are expressed by the movement of the area centroid Sg of the spot diagram having the diameter $\Phi g$.

The reduction of the variations of the exit pupil position and the image magnification are achieved by keeping the area centroid Sg fixed at the image-forming positions 10, 11 and 12 shown in FIG. 1. The 'fixed' area centroid Sg may be slightly varied within a range regarded as being fixed. Moving the second movable lens unit within a predetermined time in association with the motion of the first movable lens unit reduces the movement amount of the centroid Sg, thereby enabling reduction of the image twitching and the field angle variation.

The variations of the exit pupil position and the image magnification can be also expressed by the movement of the light-intensity centroid Pg of the image shown in FIG. 2B. The movement of the centroid Pg, represents the image twitching and the field angle variation that are visible to human eyes. Moving the second movable lens unit within a predetermined time in association with the motion of the first movable lens unit reduces the movement amount of the centroid Pg, thereby enabling reduction of the image twitching and the field angle variation.

Thus, the use of the evaluation by using the movement of the area centroid Sg of the spot diagram or that of the light-intensity centroid Pg enables a sufficient reduction of the image twitching and the field angle variation for an optical system having large distortion and large comatic aberration.

The minimum wobbling amounts of the first and second movable lens units in the AF are preferable to be amounts by which the focal position is shifted by a predetermined amount or more. This is because, if the focal position is not shifted by the predetermined amount or more for the minimum wobbling amount, the variation amount of the contrast value is insufficient for obtaining a sufficient focusing performance.

The relative ratio of the minute wobbling amounts of the first and second movable lens units is preferable to be fixed in the entire zoom range in view of controllability and cost reduction. If the minute wobbling with the fixed relative ratio in the entire zoom range can provide a sufficient effect of reducing the image twitching and the field angle variation, a stepping motor, for example, can be used for the AF.

When the relative ratio of the minute wobbling amounts of the first and second movable lens units is changed according to the zoom position (zoom state), a minute wobbling amount is read from a memory with reference to information on the zoom position and information on the aperture value and then the minute wobbling can be performed based on the read wobbling amount.

The start timing of the minute wobbling of the second movable lens unit is preferable to be within 0.2 seconds after the start of the minute wobbling of the first movable lens unit. This is because, when, for example, a moving image is recorded at 15 frames per second (15 fps), three or less frames including a image large twitching or a large field angle variation rarely provide an impression that the image twitching and the field angle variation are unnatural.

The above start timing is more preferably within 0.1 seconds, and still more preferably within 0.05 seconds.

The minute wobbling of the first and second movable lens units changes an effective aperture (F-number). Therefore, the aperture stop is preferable to be controlled such that the aperture value is increased and decreased (or wobbled, or the aperture value varies or changes) to reduce variation of the F-number.

More detailed description will hereinafter be made of the optical system (in particular the non-telecentric optical system) of this embodiment.

The optical system satisfies the following condition:

$$|tk/L|<15 \qquad (1)$$

where a distance from the position of the image plane of the optical system to the position of the exit pupil thereof is denoted by tk when the position of the exit pupil is closest to the position of the image plane, and an effective diagonal length of the image (rectangular image) at the position of the image plane is denoted by L. The wording 'the position of the exit pupil is closest to the position of the image plane' means that the positions thereof are closest to each other if the distance between the positions thereof changes in zooming.

When the optical system satisfies the condition (1), the first movable lens unit may be disposed closer to an object or the image plane than the second movable lens unit.

Further, the optical system more preferably satisfies the following condition (1a), and still more preferably satisfies the following condition (1b):

$$1<|tk/L|<10 \qquad (1a)$$

$$1.5<|tk/L|<9 \qquad (1b).$$

The minute wobbling of the first movable lens unit in this optical system changes the position and size of the image on the image plane, which makes the image twitching and the field angle variation noticeable. In particular, the image twitching and the field angle variation are more noticeable on the wide-angle side.

The condition (1) relates to the exit pupil position measured from a final surface of the image-pickup optical system.

If the distance from the image plane position to the exit pupil position is such long that the value of |tk/L| is equal to or larger than the upper limit of the condition (1), the image twitching and the field angle variation are often unnoticeable even without the minute wobbling of the second movable lens unit.

Thus, this embodiment is effective for reducing the image twitching and the field angle variation that are caused by the minute wobbling of the first movable lens unit, particularly in the optical system in which the distance from the image plane position to the exit pupil position is such short that the value of |tk/L| is lower than the upper limit of the condition (1).

Further, when the optical system is one in which the value of |tk/L| in the condition (1) is equal to or lower than 10, a significant effect of reducing the image twitching and the field angle variation can be obtained.

The optical system defined by the condition (1) can also be expressed as an optical system that satisfies the following condition:

$$|tk/ftk|<15 \qquad (2)$$

where the distance from the image plane position of the optical system to the exit pupil position is denoted by tk when the exit pupil position is closest to the image plane position, and a focal length of the optical system in that state is denoted by ftk. The wording 'the position of the exit pupil is closest to the position of the image plane' means that the positions thereof are closest to each other if the distance between the positions thereof changes in zooming.

The condition (2) also relates to the exit pupil position measured from the final surface of the image-pickup optical system, just like the condition (1). If the distance from the image plane position to the exit pupil position is such long that the value of |tk/ftk| is equal to or larger than the upper limit of the condition (2), the image twitching and the field angle variation are often unnoticeable even without the minute wobbling of the second movable lens unit.

Thus, this embodiment is effective for reducing the image twitching and the field angle variation that are caused by the minute wobbling of the first movable lens unit, particularly in the optical system in which the distance from the image plane position to the exit pupil position is such short that the value of |tk/ftk| is lower than the upper limit of the condition (2).

Furthermore, when the optical system is one in which the maximum value of |tk/ftk| in the condition (2) is equal to or lower than 10, a significant effect of reducing the image twitching and the field angle variation can be obtained.

The optical system more preferably satisfies the following condition (2a), and still more preferably satisfies the following condition (2b):

$$1<|tk/ftk|<14 \qquad (2a)$$

$$2<|tk/ftk|<13 \qquad (2b).$$

Further, in this embodiment, AF applicable to the moving image recording is realized when the optical system satisfies the following condition:

$$|Esm|<0.5 \qquad (3)$$

where Esm represents a minimum value of a positional sensitivity of the first movable lens unit.

The minimum value of the positional sensitivity means, when the positional sensitivity changes during the magnification varying (according to the zoom state), the minimum value in that change range.

In order to perform the AF for the image-pickup optical system so as to obtain a sufficient contrast difference, the image should be minutely wobbled with respect to the image plane position by about half, one-third or one-fourth of a permissible depth of field.

However, in order to obtain the sufficient contrast difference with the motion of the focus lens whose minimum positional sensitivity is smaller than 0.5, the focus lens should be wobbled such that the image magnification is varied, which results in recording of an unnatural moving image.

For a conventional optical system satisfying the condition (3), both the AF and the moving image recording are difficult to be performed. In contrast, for the optical system of this embodiment, both the AF and the moving image recording can be performed.

Furthermore, when the optical system is one in which the maximum value of |Esm| in the condition (3) is equal to or lower than 0.2, a significant effect of reducing the image twitching and the field angle variation can be obtained.

The optical system more preferably satisfies the following condition (3a), and still more preferably satisfies the following condition (3b):

$$0.01 < |Esm| < 0.45 \quad (3a)$$

$$0.05 < |Esm| < 0.33 \quad (3b).$$

Numerical examples of this embodiment will be shown below as first to fifth embodiments (Embodiments 1 to 5).

The specifications of the optical system in each embodiment are expressed as follows. In Tables 1 to 4 in Embodiments 1, 3, 4 and 5, Ri denotes a curvature radius (mm) of the i-th surface (lens surface) in order from the object side. D denotes a lens thickness (mm) or an aerial distance (mm) between the i-th surface and the (i+1)-th surface. The 'aerial distance' is defined, if glass or plastic is filled between the i-th surface and the (i+1)-th surface, by converting the thickness (distance) of the glass or plastic to a thickness (distance) in air. The conversion is performed by dividing the thickness by the refractive index.

Ni and vi denote a refractive index and an Abbe number (Abbe constant) of the material of a lens element having the i-th surface, respectively. f denotes a focal length (m), Fno denotes an F-number, and ω denotes a half field angle (°).

An aspheric shape is represented by the following expression when an X-axis is defined along an optical axis direction, an H-axis is defined along a direction perpendicular to the X-axis, a light-traveling direction is defined as positive, R denotes a paraxial curvature radius, k denotes a conic constant, and B, C, D and E denote aspheric coefficients.

$$X = \frac{\frac{H^2}{R}}{1 + \sqrt{1 - (1+k)\left(\frac{H}{R}\right)^2}} + BH^4 + CH^6 + DH^8 + EH^{10}$$

In Tables 1 to 4, a surface with * denotes an aspheric surface, and 'e–x' means 'x10$^{-x}$'.

Table 5 shows the relationship between the above-described conditions (1), (2) and (3) and each embodiment.

Embodiment 1

Figure 3:
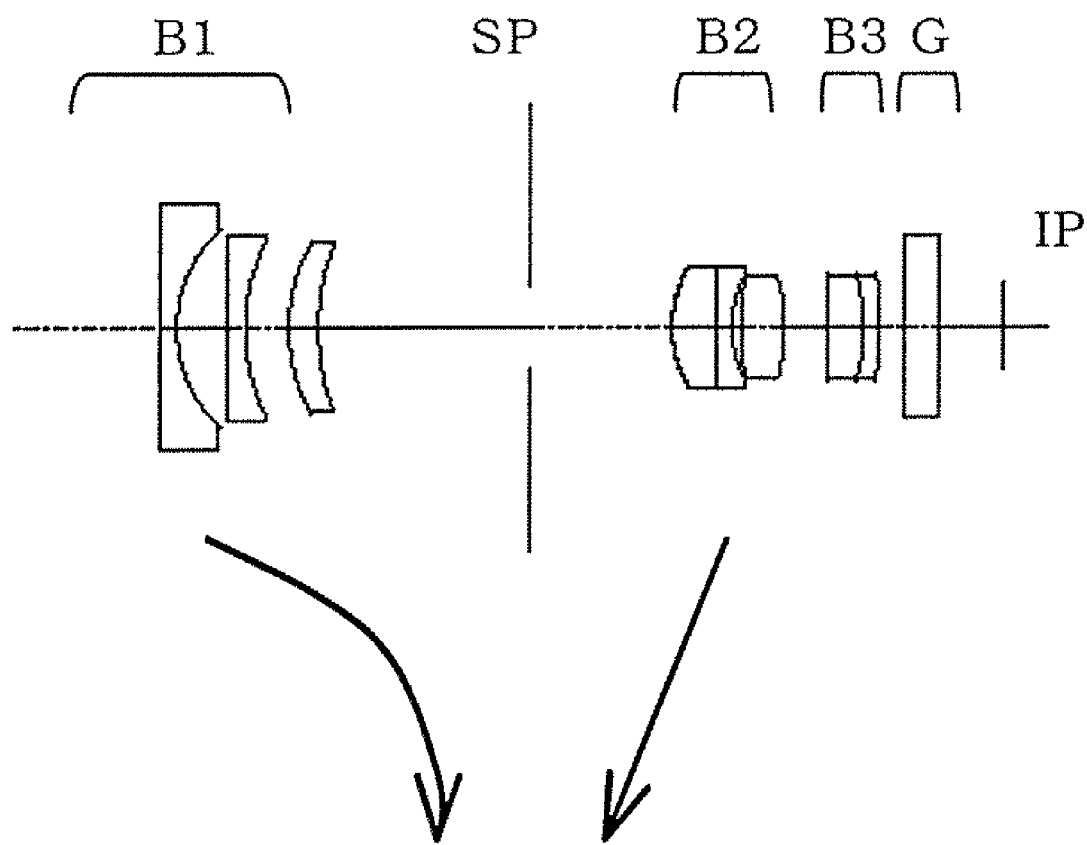
FIG. 3 is a sectional view of a zoom lens at a wide-angle end, which is provided for a video camera that is a first embodiment (Embodiment 1) of the present invention.

FIG. 3 shows a sectional view of the zoom lens (image-pickup optical system) at a wide-angle end, which is a first embodiment. The zoom lens has the optical configuration shown in TABLE 1.

TABLE 1

| f = 3.52~6.47~8.88 Fno = 2.1~2.66~3.5 2ω = 65.2~38.4~28.4 | | | |
|---|---|---|---|
| R1 = 500.00000 | D1 = 1.000 | N1 = 1.48749 | v1 = 70.2 |
| R2 = 7.20738 | D2 = 2.743 | | |
| R3 = −179.53900 | D3 = 1.000 | N3 = 1.48749 | v3 = 70.2 |
| R4 = 10.49384 | D4 = 2.370 | | |
| R5 = 9.29148 | D5 = 1.600 | N5 = 1.76182 | v5 = 26.5 |
| R6 = 12.36689 | D6 = VARIABLE | | |
| R7 = APERTURE STOP | D7 = VARIABLE | | |
| *R8 = 6.23710 | D8 = 2.500 | N8 = 1.69350 | v8 = 53.2 |
| R9 = ∞ | D9 = 0.800 | N9 = 1.69895 | v9 = 30.1 |
| R10 = 6.16765 | D10 = 0.471 | | |
| R11 = 14.8436 | D11 = 2.4000 | N11 = 1.60311 | v11 = 60.6 |
| R12 = −10.2412 | D12 = VARIABLE | | |
| R13 = 52.4000 | D13 = 2.000 | N13 = 1.69680 | v13 = 55.5 |
| R14 = −8.6000 | D14 = 0.800 | N14 = 1.80518 | v14 = 25.4 |
| R15 = −32.9000 | D15 = 1.400 | | |
| R16 = ∞ | D16 = 2.000 | N16 = 1.51633 | v16 = 64.1 |
| R17 = ∞ | | | |

| | FOCAL LENGTH | | |
|---|---|---|---|
| VARIABLE DISTANCE | 3.52 | 6.47 | 8.88 |
| D6 | 11.50 | 3.23 | 2.33 |
| D7 | 7.75 | 4.15 | 1.20 |
| D12 | 2.40 | 6.00 | 8.95 |

| ASPHERIC COEFFICIENT | | | | |
|---|---|---|---|---|
| *R8 | k = −6.27256e−01 | B = −1.46455e−04 | C = 3.29397e−06 | D = −6.85706e−08 |

The compensator that is the first movable lens unit is constituted by surfaces R1 to R6, and the variator that is the second movable lens unit is constituted by surfaces R8 to R12. The compensator is movable and serves also as a focus lens. The compensator corresponds to a first lens unit B1 disposed closest to an object, and the variator corresponds to a second lens unit B2 disposed closer to the image plane IP than the first lens unit B1.

In the zoom lens of this embodiment, the aperture stop SP is disposed between the first lens unit B1 and the second lens unit B2, and a third lens unit B3 and a glass block G such as an optical filter are disposed closer to the image plane IP than the second lens unit B2.

Arrows in the figure are movement loci of the lens units shown above the arrows (the second and third lens units B2 and B3 in FIG. 3) in zooming from the wide-angle end to the telephoto end. This is also applied to the other embodiments.

Figure 4:
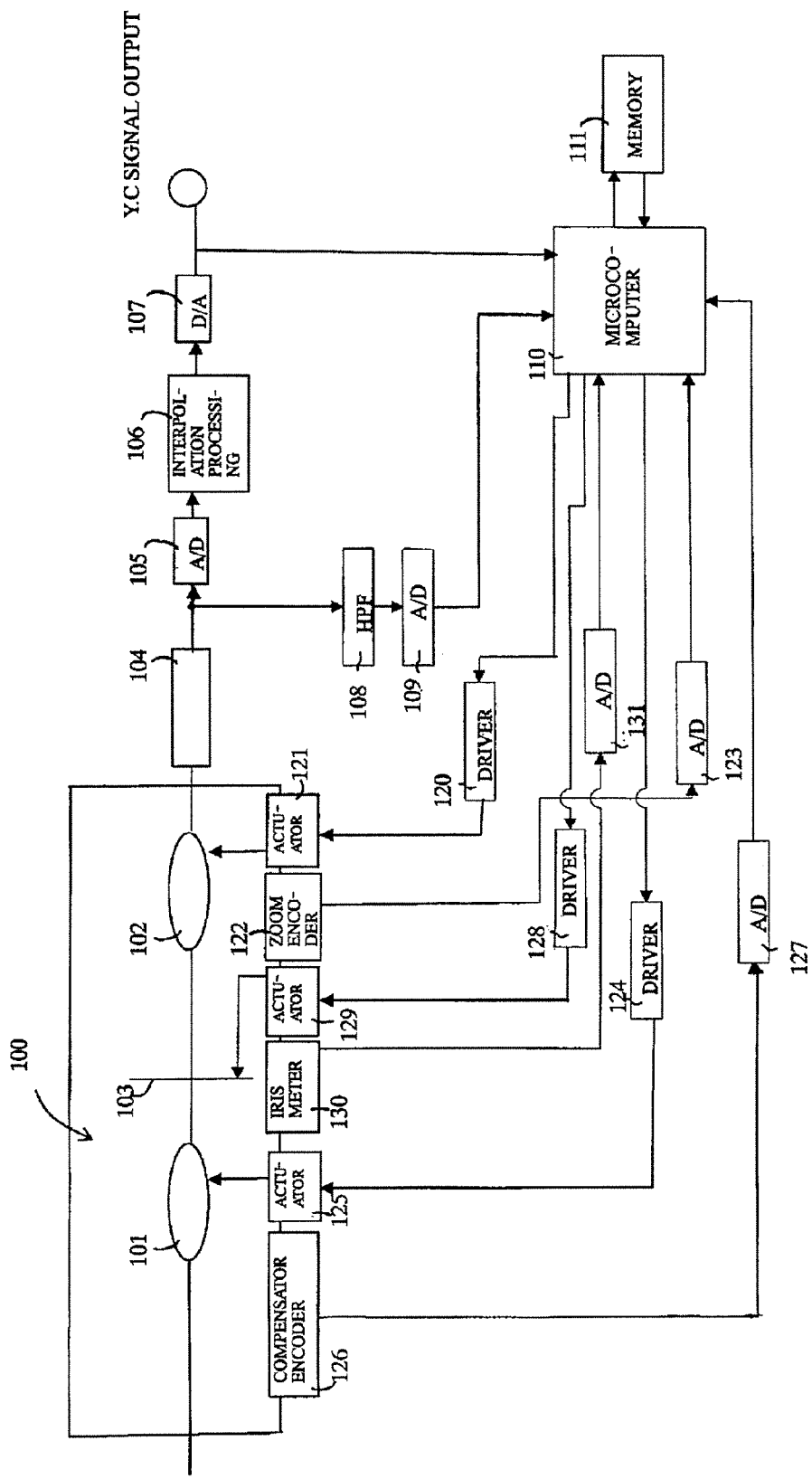
FIG. 4 is a block diagram showing the configuration of the video camera of Embodiment 1 on which the zoom lens is mounted.

FIG. 4 shows the configuration of a video camera as an optical apparatus provided with the image-pickup optical system shown in TABLE 1.

In FIG. 4, reference numeral 100 denotes the image-pickup optical system. Reference numeral 101 denotes the compensator (compensating lens unit), 102 the variator (magnification varying lens unit), 103 the aperture stop, and 104 an image-pickup element such as a CCD sensor or a CMOS sensor. The compensator 101 and the variator 102 are independently movable in the optical axis direction. In other words, the compensator 101 and the variator 102 are moved (movable) along movement loci different from each other in zooming. The movements thereof are controlled by a common control system or independent control systems.

Signals from the image-pickup element 104 are processed by an A/D converter 105, an interpolation processing circuit 106, a D/A converter 107, an HPF (High-Pass Filter) 108 and an A/D converter 109. Image signals thereby created are input to a microcomputer 110 serving as a controller. Y (brightness) signals and C (color) signals of the image signals can be output from an external output terminal.

The microcomputer 110 performs various controls, if necessary with reference to data stored in a memory 111. The microcomputer 110 also performs contrast AF control causing the compensator 101 to minutely wobble based on the contrast value (AF evaluation value signal) obtained by extracting high-frequency components from the image signals. Further, the microcomputer 110 causes the variator 102 to minutely wobble in association with the minute wobbling of the compensator 101.

The compensator 101 is driven in the optical axis direction by a first actuator 125. The first actuator 125 is controlled by the microcomputer 110 via a first driver 124.

The position of the compensator 101 is detected by the microcomputer 110 via a compensator encoder 126 that is a first position detector and an A/D converter 127.

The variator 102 is driven in the optical axis direction by a second actuator 121. The second actuator 121 is controlled by the microcomputer 110 via a second driver 120.

The position of the variator 102 is detected by the microcomputer 110 via a zoom encoder 122 that is a second position detector and an A/D converter 123. The zoom encoder 122 and the compensator encoder 126 are constituted by, for example, a pulse plate that is rotated by each actuator and a photo interrupter whose output signal changes between in a light-shielded state and in a light-passing state.

The aperture stop 103 is driven by a third actuator 129. The third actuator 129 is controlled by the microcomputer 110 via a third driver 128.

The position (aperture value) of the aperture stop 103 is detected by the microcomputer 110 via an iris meter 130 that is a third position detector and an A/D converter 131.

This embodiment employs as an evaluation method of the image twitching and the field angle variation, the method using the movement of the light-intensity centroid Pg of the image out of focus by the predetermined amount.

In this embodiment, in order to reduce the movement of the light-intensity centroid Pg of the image out of focus (close to zero) when the compensator 101 is moved in the optical axis direction by 10 μm on the wide-angle side, the variator 102 is moved in the same direction as that of the compensator 101 by 4 μm. On the other hand, when the compensator 101 is moved in the optical axis direction by 10 μm on the telephoto side, the variator 102 is moved in the same direction as that of the compensator 101 by 6 μm.

The microcomputer 110 determines these movement amounts (wobbling amounts) by reading from the memory 111 movement amount data according to zoom position information (zoom state) obtained from the zoom encoder 122.

In this embodiment, as described above, the movement amount of the variator 102 for that of the compensator 101 is different depending on the zoom position. In other words, the ratio (relative ratio) of the movement amount of the second movable lens unit to that of the first movable lens unit changes depending on the zoom position (zoom state or zoom information). Therefore, this embodiment uses voice coil motors (VCMs) as the first and second actuators that respectively drive the compensator 101 and the variator 102 to accurately control the positions of the compensator 101 and the variator 102.

Figure 5:
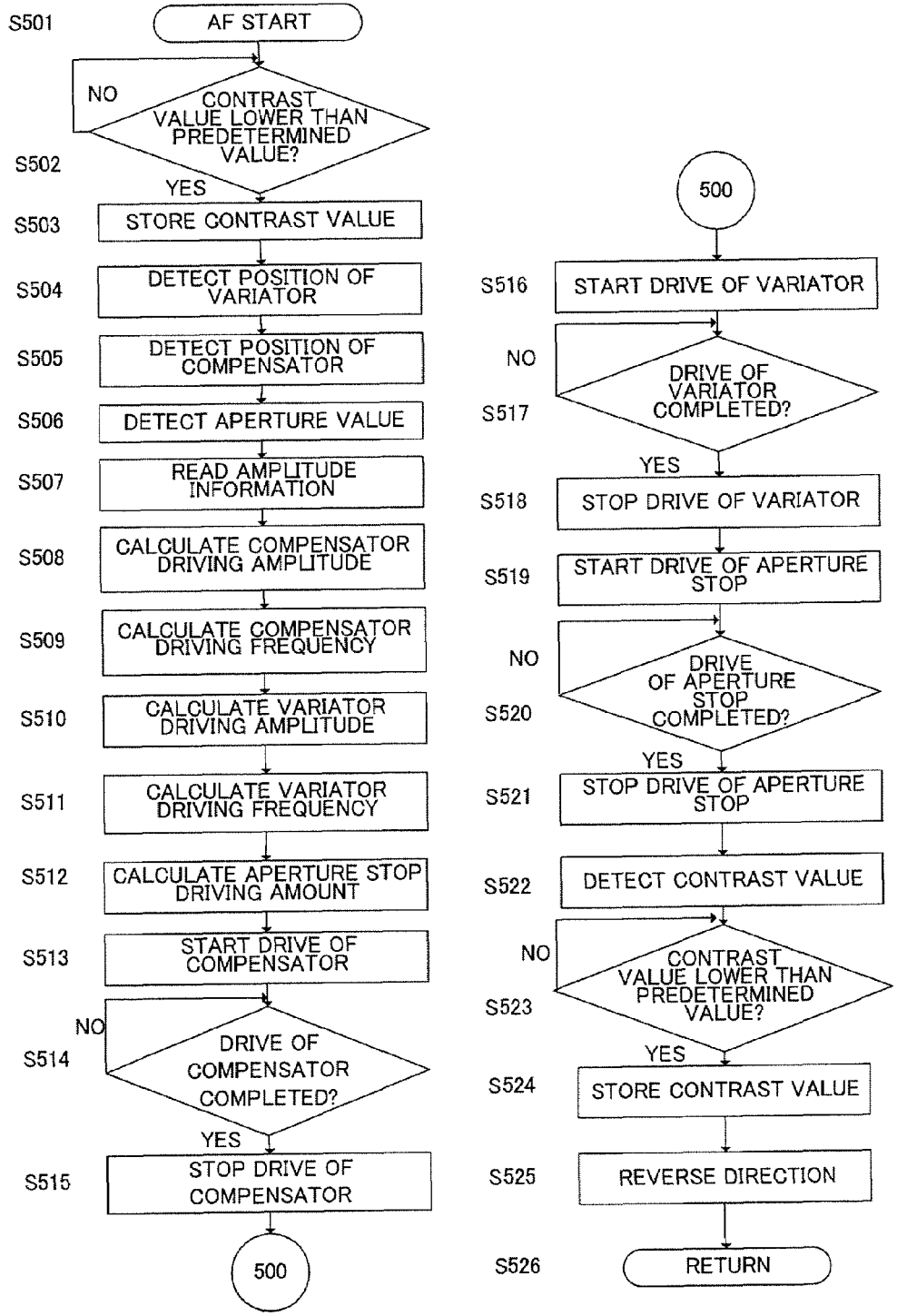
FIG. 5 is a flowchart showing operations of the video camera of Embodiment 1.

Next, the AF control in this embodiment will be described with reference to FIG. 5. This AF control is performed by the microcomputer 110 according to computer programs stored in its internal memory. Parts with the circled numeral '500' in FIG. 5 are connected to each other.

When the power of the video camera is turned on, the microcomputer 110 starts the AF control at step S501. The microcomputer 110 determines at step S502 whether or not the contrast value is lower than a predetermined value. If the contrast value is equal to or higher than the predetermined value, the microcomputer 110 regards the current focus state as an in-focus state without causing the compensator 101 to wobble and then repeats the determination of the contrast value. If the contrast value is lower than the predetermined value, the microcomputer 110 stores the contrast value into its internal RAM at step S503.

Next, the microcomputer 110 detects the position of the variator 102 at step S504 and detects the position of the compensator 101 at step S505. Further, the microcomputer 110 detects the aperture value of the aperture stop 103 at step S506. These detected values are stored into the RAM.

At step S507, the microcomputer 110 reads from the memory 111 amplitude information for the compensator 101 and the variator 102 according to the detected positions of the compensator 101 and variator 102 and the detected aperture value of the aperture stop 103. The amplitude information for the variator 102 is a movement amount required to reduce the variation of the exit pupil position of the image-pickup optical system 100, the variation being caused by the wobbling of the compensator 101.

At step S508, the microcomputer 110 calculates a driving amplitude amount of the compensator 101 from the read amplitude information. Then at step S509, the microcomputer 110 calculates a driving frequency of the compensator 101.

Further, at step S510, the microcomputer 110 calculates a driving amplitude amount of the variator 102 from the read amplitude information. Then at step S511, the microcomputer 110 calculates a driving frequency of the variator 102.

Next, at step S512, the microcomputer 110 calculates a driving amount of the aperture stop 103 according to the driving amplitude amounts of the compensator 101 and variator 102. The driving amount of the aperture stop 103 is a driving amount required to reduce the variation of the F-number, the variation being caused by the wobbling of the compensator 101 and variator 102.

At step S513, the microcomputer 110 starts drive of the compensator 101 of the driving amplitude amount thereof to one side of the optical axis direction. Then at step S514, the microcomputer 110 determines whether or not the drive of the compensator 101 of the driving amplitude amount has been completed. If the drive of the compensator 101 of the driving amplitude amount has not been completed, the microcomputer 110 repeats the determination. If the drive of the compensator 101 of the driving amplitude amount has been completed, the microcomputer 110 stops the drive of the compensator 101 at step S515.

At step S516, the microcomputer 110 starts drive of the variator 102 of the driving amplitude amount thereof to one side of the optical axis direction. Then at step S517, the microcomputer 110 determines whether or not the drive of the variator 102 of the driving amplitude amount has been completed. If the drive of the variator 102 of the driving amplitude amount has not been completed, the microcomputer 110 repeats the determination. If the drive of the variator 102 of the driving amplitude amount has been completed, the microcomputer 110 stops the drive of the variator 102 at step S518.

Next, at step S519, the microcomputer 110 starts drive of the aperture stop 103 of the driving amount thereof in one of opening and closing directions. Then at step S520, the microcomputer 110 determines whether or not the drive of the aperture stop 103 the driving amount has been completed. If the drive of the aperture stop 103 of the driving amount has not been completed, the microcomputer 110 repeats the determination. If the drive of the aperture stop 103 of the driving amount has been completed, the microcomputer 110 stops the drive of the aperture stop 103 at step S521.

Next, the microcomputer 110 reads the contrast value at step S522.

Then at step S523, the microcomputer 110 determines whether or not the contrast value is lower than the predetermined value. If the contrast value is equal to or higher than the predetermined value, the microcomputer 110 repeats the determination. If the contrast value is lower than the predetermined value, the microcomputer 110 stores the above contrast value at step S524 and then proceeds to step S525. At step S525, the microcomputer 110 reverses the driving direction of the compensator 101, and then at step S526 the microcomputer 110 returns to step S513.

When the driving direction of the compensator 101 is reversed, the driving directions of the variator 102 and aperture stop 103 are also reversed.

Repeating the above-described processes enables the minute wobbling of the compensator 101 and the variator 102 in the optical axis direction and the minute wobbling of the aperture stop 103 so as to increase and decrease the aperture value (that is, the aperture value varies or changes).

The microcomputer 110 compares the contrast values thus obtained in the respective routines to determine the direction in which the contrast value increases, that is, the direction in which the in-focus position exists (in-focus direction or information relating to the in-focus position).

After the determination of the in-focus direction, the microcomputer 110 causes the compensator 101 and the variator 102 to move step by step with a predetermined amount in the in-focus direction, and then causes the compensator 101, the variator 102 and the aperture stop 103 to minutely wobble when the obtained contrast value becomes near the maximum value. At this time, the microcomputer 110 determines a center position of a range where the contrast value increases and decreases (information relating to the in-focus position) to define the center as the in-focus position. This in-focus position corresponds to a position of the variator or compensator where the contrast value becomes the maximum, a position thereof close to the above position where the contrast value exceeds a certain value, or the like.

When the in-focus state is thus obtained, the microcomputer 110 stops the drive of the compensator 101, the variator 102 and the aperture stop 103 and then returns to step S502 to continue the AF control.

Embodiment 2

Embodiment 1 used the voice coil motors (VCMs) as the first and second actuators 125 and 121 that drive the compensator 101 and variator 102. However, this embodiment uses stepping motors as the first and second actuators.

This embodiment also employs as an evaluation method of the image twitching and the field angle variation, the method using the movement of the light-intensity centroid Pg of the image out of focus by the predetermined amount.

Also in this embodiment, in order to reduce the movement of the light-intensity centroid Pg of the image out of focus (close to zero) when the compensator 101 is moved in the optical axis direction by 10 µm on the wide-angle side, the variator 102 is moved in the same direction as that of the compensator 101 by 4 µm. On the other hand, when the compensator 101 is moved in the optical axis direction by 10 µm on the telephoto side, the variator 102 is moved in the same direction as that of the compensator 101 by 6 µm.

However, the use of the stepping motor does not enable accurate control like when using the VCM because of the pulsed drive of the stepping motor and the limit of manufacturing accuracy of the lead screw. Therefore, in this embodiment, the compensator 101 and the variator 102 are caused to wobble in the same direction by movement amounts (wobbling amounts) of a fixed ratio (for example, 2:1). Thus, the image twitching and the field angle variation can be sufficiently reduced.

Embodiment 3

Figure 6:
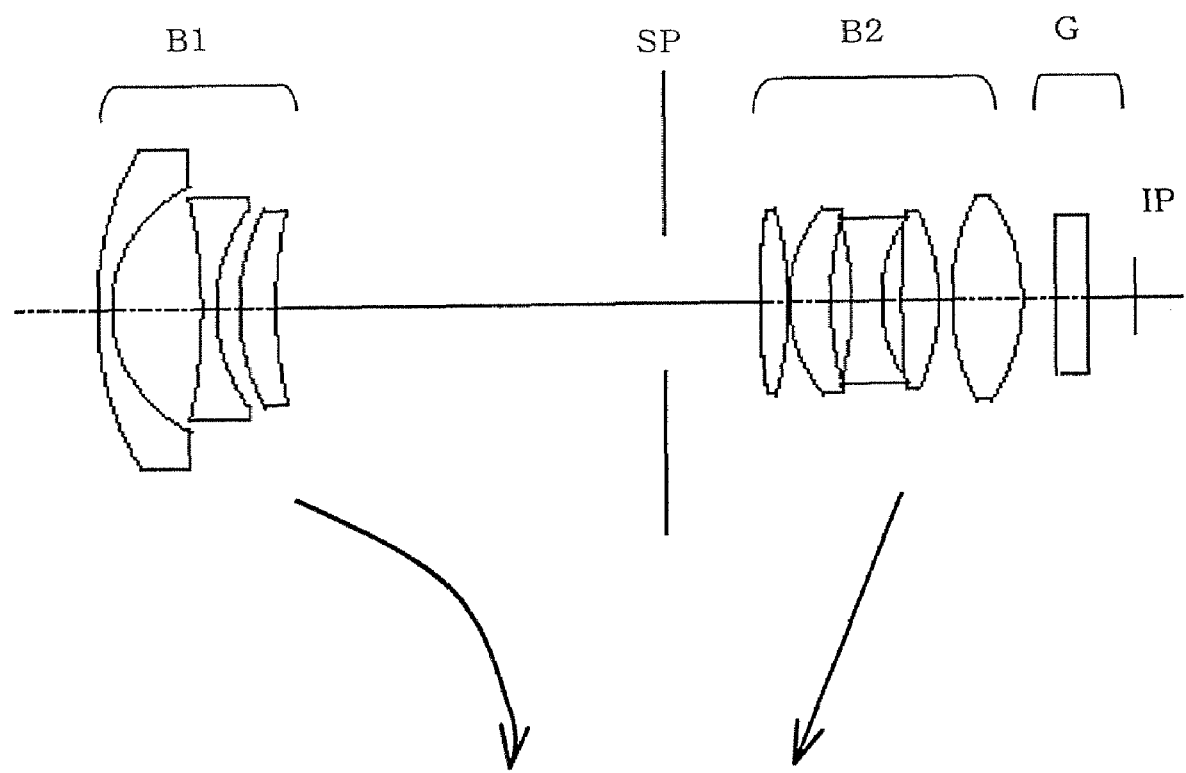
FIG. 6 is a sectional view of a vari-focal lens at a wide-angle end, which is provided for a video camera that is a third embodiment (Embodiment 3) of the present invention.

FIG. 6 shows a sectional view of a vari-focal lens (image-pickup optical system) at a wide-angle end, which is a third embodiment. The vari-focal lens has the optical configuration shown in TABLE 2.

TABLE 2

| f = 2.67~4.21~5.76 Fno = 1.4~1.4~1.4 2ω = 73.6~50.8~38.3 | | | |
|---|---|---|---|
| R1 = 19.78209 | D1 = 0.900 | N1 = 1.64000 | ν1 = 60.2 |
| R2 = 8.26867 | D2 = 5.400 | | |
| R3 = −30.22480 | D3 = 0.900 | N3 = 1.64000 | ν3 = 60.2 |
| R4 = 10.33476 | D4 = 1.400 | | |
| R5 = 12.85371 | D5 = 2.200 | N5 = 1.84666 | ν5 = 23.8 |
| R6 = 24.84249 | D6 = VARIABLE | | |
| R7 = APERTURE STOP | D7 = VARIABLE | | |
| *R8 = 38.83714 | D8 = 1.700 | N8 = 1.78590 | ν8 = 43.9 |
| R9 = −21.07820 | D9 = 0.100 | | |
| R10 = 9.03651 | D10 = 2.500 | N10 = 1.69680 | ν10 = 55.5 |
| R11 = 19.64571 | D11 = 1.260 | | |
| R12 = −17.63970 | D12 = 1.800 | N12 = 1.80518 | ν12 = 25.5 |

TABLE 2-continued

R13 = 8.85416         D13 = 1.200
R14 = 60.00000        D14 = 2.200        N14 = 1.69680      v14 = 55.5
R15 = −12.50000       D15 = 0.800
R16 = 13.75000        D16 = 4.200        N16 = 1.51680      v16 = 64.2
R17 = −11.20000       D17 = VARIABLE
R18 = ∞               D18 = 2            N18 = 1.51680      v18 = 64.2
R19 = ∞

|  | FOCAL LENGTH | | |
| --- | --- | --- | --- |
| VARIABLE DISTANCE | 2.67 | 4.21 | 5.76 |
| D6 | 23.32 | 9.69 | 4.37 |
| D7 | 5.68 | 3.84 | 2.00 |
| D17 | 2.00 | 3.84 | 5.68 |

ASPHERIC COEFFICIENT

*R8   k = 2.27840e−01   B = −5.64997e−06   C = 2.47083e−10   D = 3.34484e−19
      E = 1.80763e−27

The compensator that is the first movable lens unit is constituted by surfaces R1 to R6, and the variator that is the second movable lens unit is constituted by surfaces R8 to R17. The compensator serves also as a focus lens. The compensator corresponds to a first lens unit B1 disposed closest to an object, and the variator corresponds to a second lens unit B2 disposed closer to the image plane IP than the first lens unit B1.

In the vari-focal lens of this embodiment, the aperture stop SP is disposed between the first lens unit B1 and the second lens unit B2, and a glass block G such as an optical filter is disposed closer to the image plane IP than the second lens unit B2.

The vari-focal lens of this embodiment is used as an image-pickup optical system for a video camera (for example, a monitoring camera) having the similar configuration to that of the video camera shown in FIG. 4.

The vari-focal lens has a characteristic in which distortion is large. Therefore, this embodiment employs as an evaluation method of the image twitching and the field angle variation, the method using the movement of the area centroid Sg of the image out of focus by the predetermined amount. However, the image out of focus by the predetermined amount is difficult to be evaluated using an image magnification calculated as an approximate amount.

Figure 7:
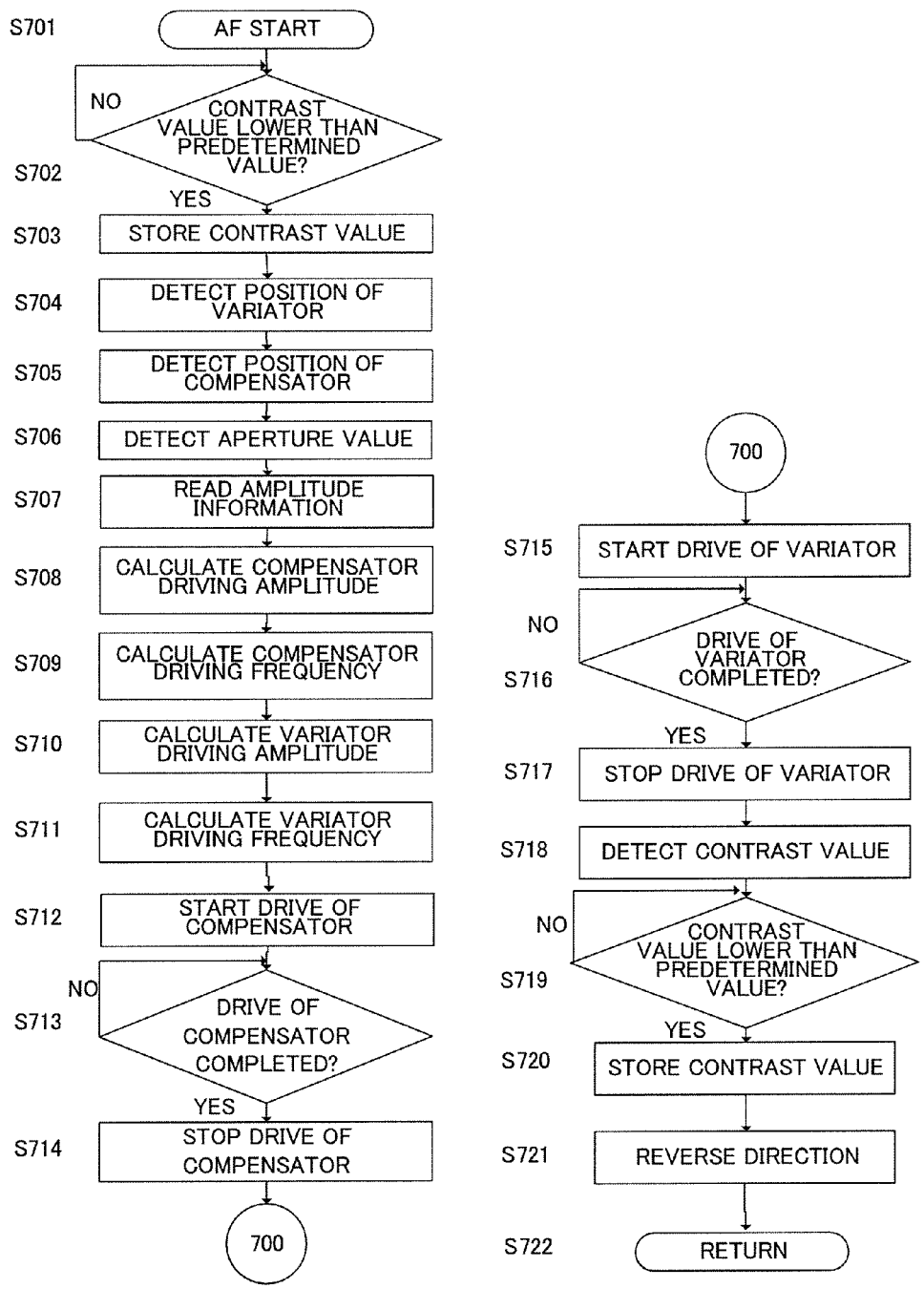
FIG. 7 is a flowchart showing operations of the video camera of Embodiment 3.

The AF control in this embodiment will be described below with reference to FIG. 7. This AF control is performed by the microcomputer 110 according to computer programs stored in its internal memory. Parts with the circled numeral '700' in FIG. 7 are connected to each other. Reference numerals 101 and 102 are respectively assigned to the compensator and the variator as in Embodiment 1, and the same reference numerals are assigned to the other components corresponding to those in Embodiment 1.

When the power of the video camera is turned on, the microcomputer 110 starts the AF control at step S701. The microcomputer 110 determines at step S702 whether or not the contrast value is lower than a predetermined value. If the contrast value is equal to or higher than the predetermined value, the microcomputer 110 regards the current focus state as an in-focus state without causing the compensator 101 to wobble and then repeats the determination of the contrast value. If the contrast value is lower than the predetermined value, the microcomputer 110 stores the contrast value into its internal RAM at step S703.

Next, the microcomputer 110 detects the position of the variator 102 at step S704 and detects the position of the compensator 101 at step S705. Further, the microcomputer 110 detects the aperture value of the aperture stop 103 at step S706. These detected values are stored into the RAM.

At step S707, the microcomputer 110 reads from the memory 111 amplitude information for the compensator 101 and the variator 102 according to the detected positions of the compensator 101 and variator 102 and the detected aperture value of the aperture stop 103. The amplitude information for the variator 102 is a movement amount required to reduce the variation of the exit pupil position of the image-pickup optical system 100, the variation being caused by the wobbling of the compensator 101.

At step S708, the microcomputer 110 calculates a driving amplitude amount of the compensator 101 from the read amplitude information. Then at step S709, the microcomputer 110 calculates a driving frequency of the compensator 101.

Further, at step S710, the microcomputer 110 calculates a driving amplitude amount of the variator 102 from the read amplitude information. Then at step S711, the microcomputer 110 calculates a driving frequency of the variator 102.

At step S712, the microcomputer 110 starts drive of the compensator 101 of the driving amplitude amount thereof to one side of the optical axis direction. Then at step S713, the microcomputer 110 determines whether or not the drive of the compensator 101 of the driving amplitude amount has been completed. If the drive of the compensator 101 of the driving amplitude amount has not been completed, the microcomputer 110 repeats the determination. If the drive of the compensator 101 of the driving amplitude amount has been completed, the microcomputer 110 stops the drive of the compensator 101 at step S714.

At step S715, the microcomputer 110 starts drive of the variator 102 of the driving amplitude amount thereof to one side of the optical axis direction. Then at step S716, the microcomputer 110 determines whether or not the drive of the variator 102 of the driving amplitude amount has been completed. If the drive of the variator 102 of the driving amplitude amount has not been completed, the microcomputer 110 repeats the determination. If the drive of the variator 102 of the driving amplitude amount has been completed, the microcomputer 110 stops the drive of the variator 102 at step S717.

Next, the microcomputer 110 reads the contrast value at step S718.

Then at step S719, the microcomputer 110 determines whether or not the contrast value is lower than the predetermined value. If the contrast value is equal to or higher than the predetermined value, the microcomputer 110 repeats the determination. If the contrast value is lower than the predetermined value, the microcomputer 110 stores the above contrast value at step S720 and then proceeds to step S721. At step S721, the microcomputer 110 reverses the driving direction of the compensator 101, and then at step S722 the microcomputer 110 returns to step S712.

When the driving direction of the compensator 101 is reversed, the driving direction of the variator 102 is also reversed.

Repeating the above-described processes enables the minute wobbling of the compensator 101 and the variator 102 in the optical axis direction.

The microcomputer 110 compares the contrast values thus obtained in the respective routines to determine the direction (in-focus direction) in which the contrast value increases.

After the determination of the in-focus direction, the microcomputer 110 causes the compensator 101 and the variator 102 to move step by step with a predetermined amount in the in-focus direction, and then causes the compensator 101 and the variator 102 to minutely wobble when the obtained contrast value becomes near the maximum value. At this time, the microcomputer 110 determines a center position of a range where the contrast value increases and decreases to define the center as the in-focus position.

When the in-focus state is thus obtained, the microcomputer 110 stops the drive of the compensator 101 and the variator 102 and then returns to step S702 to continue the AF control.

Embodiment 4

Figure 8:
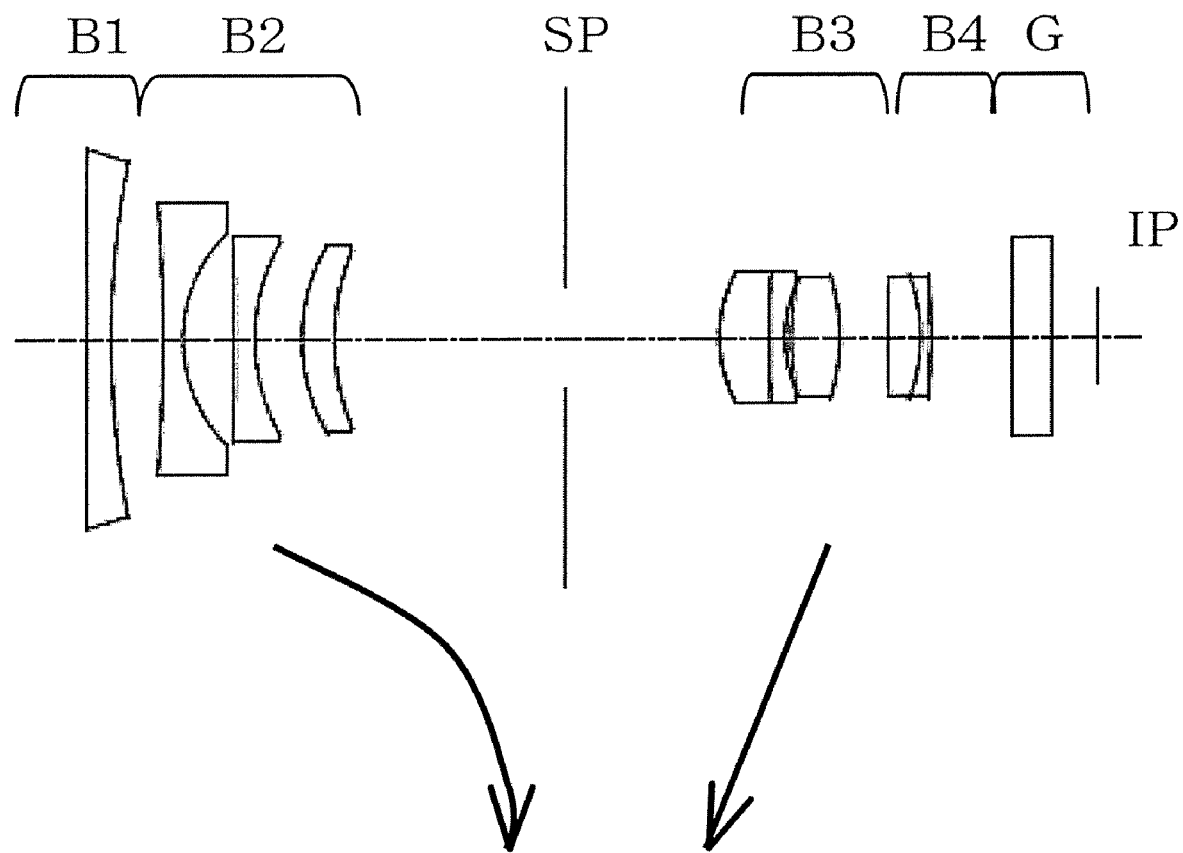
FIG. 8 is a sectional view of a zoom lens at a wide-angle end, which is provided for a video camera that is a fourth embodiment (Embodiment 4) of the present invention.

FIG. 8 shows a sectional view of a zoom lens at a wide-angle end, which is a fourth embodiment. The zoom lens has the optical configuration shown in TABLE 3.

The compensator that is the first movable lens unit is constituted by surfaces R4 to R8, and the variator that is the second movable lens unit is constituted by surfaces R10 to R14. The compensator serves also as a focus lens. The compensator corresponds to a second lens unit B2 disposed closer to the image plane IP than a first lens unit B1 disposed closest to an object, and the variator corresponds to a third lens unit B3 disposed closer to the image plane IP than the second lens unit B2.

In the zoom lens of this embodiment, the aperture stop SP is disposed between the second lens unit B2 and the third lens unit B3, and a fourth lens unit B4 and a glass block G such as an optical filter are disposed closer to the image plane IP than the third lens unit B3.

The zoom lens of this embodiment is used as an image-pickup optical system for a video camera having the similar configuration to that of the video camera shown in FIG. 4.

This embodiment employs as an evaluation method of the image twitching and the field angle variation, the method using the light-intensity centroid Pg.

Figure 9:
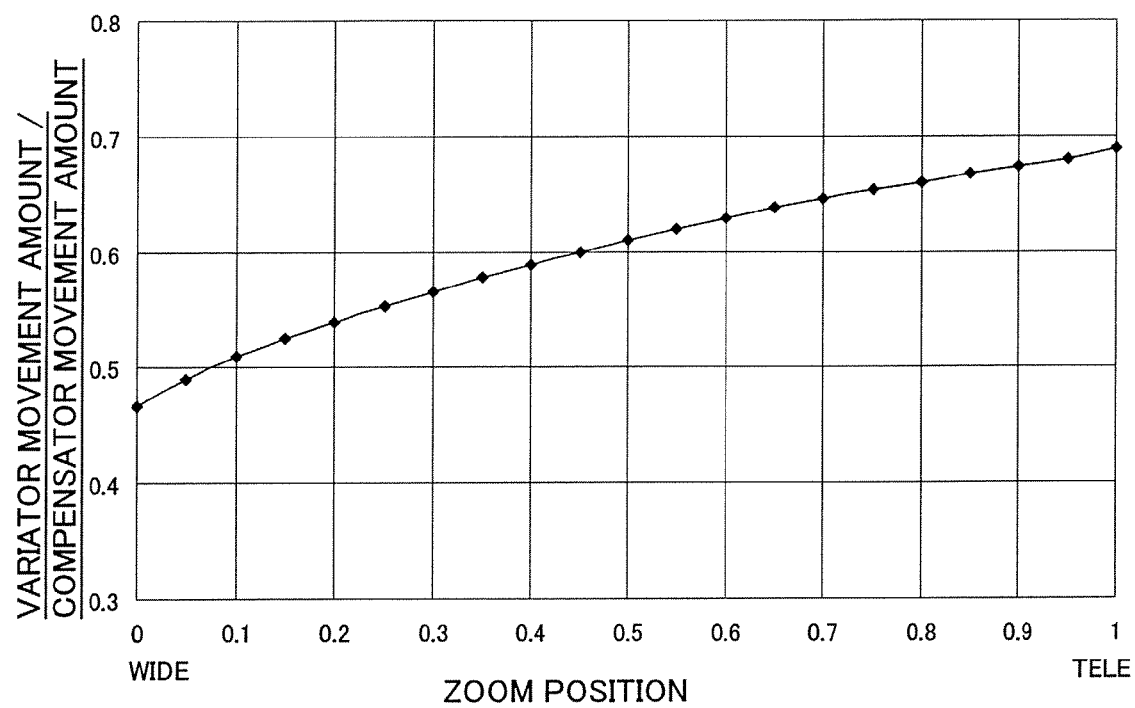
FIG. 9 is an evaluation chart showing the results of evaluations made by using a light-intensity centroid Pg.

FIG. 9 shows the relative ratio of the movement amounts of the compensator and variator (the movement amount of the variator/the movement amount of the compensator), at which the light-intensity centroid Pg is fixed at an image height of 0.6. The horizontal axis in FIG. 9 shows zoom positions normalized by setting the entire zoom range to 1, and the vertical axis shows the relative ratio of the movement amounts of the compensator and variator.

The minute wobbling of the compensator and variator with the relationship of the relative ratio of the movement amounts shown in this figure enables reduction of the image twitching and the field angle variation.

TABLE 3 f = 3.15~5.20~7.00  Fno = 2.2~2.8~3.4  2ω = 71.1~46.8~35.6

| | | | |
|---|---|---|---|
| R1 = ∞ | D1 = 1.200 | N1 = 1.51680 | ν1 = 64.2 |
| R2 = 46.45045 | D2 = 2.600 | | |
| R3 = −81.47419 | D3 = VARIABLE | N3 = 1.48749 | ν3 = 70.2 |
| R4 = 7.47741 | D4 = 2.563 | | |
| R5 = −149.51455 | D5 = 1.000 | N5 = 1.48749 | ν5 = 70.2 |
| R6 = 9.65212 | D6 = 2.370 | | |
| R7 = 9.44763 | D7 = 1.600 | N7 = 1.76182 | ν7 = 26.5 |
| R8 = 11.91496 | D8 = VARIABLE | | |
| R9 = APERTURE STOP | D9 = VARIABLE | | |
| *R10 = 6.43824 | D10 = 2.500 | N10 = 1.69350 | ν10 = 53.2 |
| R11 = 63.80033 | D11 = 0.800 | N11 = 1.69895 | ν11 = 30.1 |
| R12 = 6.45705 | D12 = 0.331 | | |
| R13 = 14.27765 | D13 = 2.400 | N13 = 1.60311 | ν13 = 60.6 |
| R14 = −10.62124 | D14 = VARIABLE | | |
| R15 = 122.24927 | D15 = 1.600 | N15 = 1.69680 | ν15 = 55.5 |
| R16 = −8.93064 | D16 = 0.500 | N16 = 1.80518 | ν16 = 25.4 |
| R17 = −40.38713 | D17 = 4.000 | | |
| R18 = ∞ | D18 = 2.000 | N18 = 1.51633 | ν18 = 64.1 |
| R19 = ∞ | | | |

| | FOCAL LENGTH | | |
|---|---|---|---|
| VARIABLE DISTANCE | 3.15 | 5.20 | 7.00 |
| D2 | 2.60 | 9.03 | 9.52 |
| D8 | 11.50 | 5.07 | 4.58 |
| D10 | 7.75 | 4.15 | 1.20 |
| D14 | 2.40 | 6.00 | 8.95 |

ASPHERIC COEFFICIENT

*R10  k = −7.64491e−01    B = −7.32333e−05    C = 3.29389e−06    D = −6.85706e−08

Embodiment 5

Figure 10:
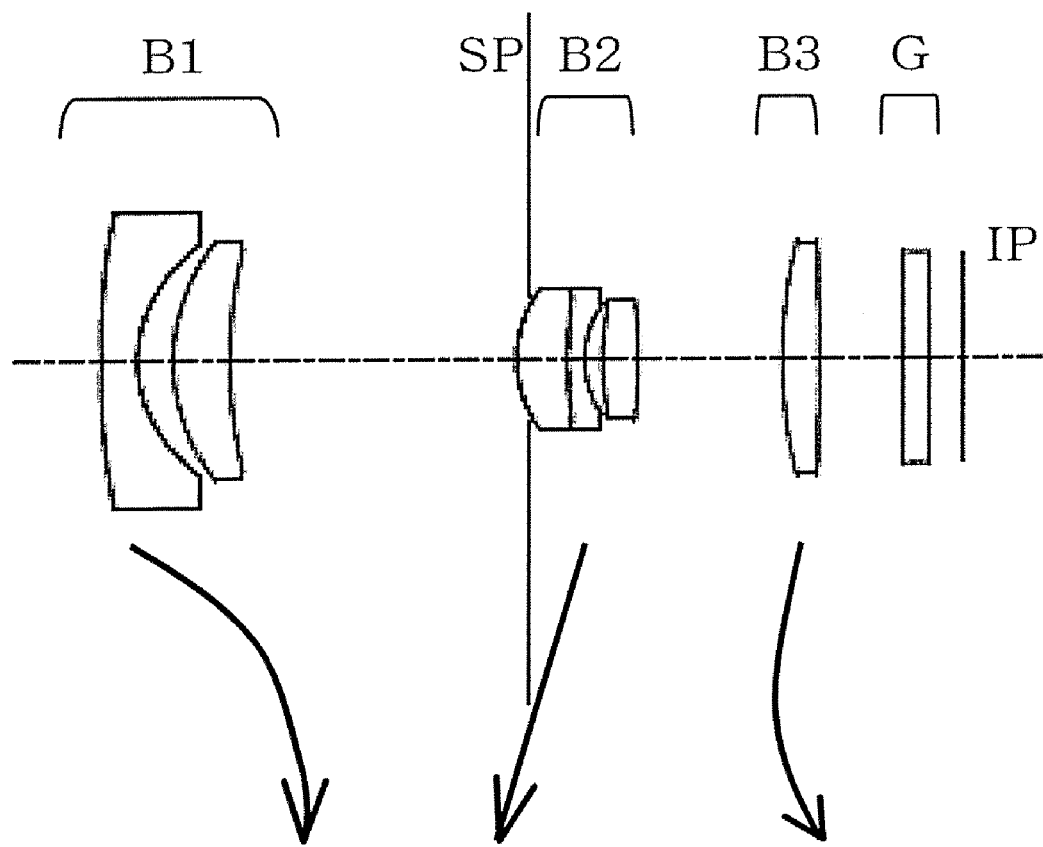
FIG. 10 is a sectional view of a zoom lens at a wide-angle end, which is provided for a digital still camera that is a fifth embodiment (Embodiment 5) of the present invention.

FIG. 10 shows a sectional view of a zoom lens at a wide-angle end, which is a fifth embodiment. The zoom lens has the optical configuration shown in TABLE 4.

TABLE 4 f = 6.33~11.73~17.53 Fno = 2.8~3.9~5.0 2ω = 50.7~28.7~19.4

| | | | |
|---|---|---|---|
| *R1 = 36.76270 | D1 = 1.300 | N1 = 1.85135 | ν1 = 40.1 |
| *R2 = 4.60425 | D2 = 1.250 | | |
| R3 = 6.88502 | D3 = 1.950 | N3 = 1.84666 | ν3 = 23.8 |
| R4 = 16.47213 | D4 = VARIABLE | | |
| R5 = APERTURE STOP | | | |
| *R6 = 4.06015 | D6 = 2.300 | N6 = 1.85135 | ν6 = 40.1 |
| R7 = 16.17406 | D7 = 0.600 | N7 = 1.80810 | ν7 = 22.8 |
| R8 = 3.34549 | D8 = 0.642 | | |
| R9 = 10.66503 | D9 = 1.250 | N9 = 1.69680 | ν9 = 55.5 |
| R10 = −17.51792 | D10 = VARIABLE | | |
| R11 = 16.61775 | D11 = 1.300 | N11 = 1.60311 | ν11 = 60.6 |
| R12 = −151.37044 | D12 = VARIABLE | | |
| R13 = ∞ | D13 = 1.000 | N13 = 1.51633 | ν13 = 64.1 |
| R14 = ∞ | | | |

| | FOCAL LENGTH | | |
|---|---|---|---|
| VARIABLE DISTANCE | 6.33 | 11.73 | 17.53 |
| D4 | 10.09 | 3.21 | 0.32 |
| D10 | 5.07 | 11.05 | 16.38 |
| D12 | 2.90 | 1.91 | 1.59 |

ASPHERIC COEFFICIENT

| | | | | |
|---|---|---|---|---|
| *R1 | k = 5.27687e−01 | B = 2.21722e−04 | C = −2.45843e−06 | D = 2.13724e−08 |
| *R2 | k = −1.58156 | B = 1.69311e−03 | C = 3.79971e−06 | D = 1.26231e−07 |
| *R6 | k = −7.64491e−01 | B = −−7.32333e−05 | C = 3.29389e−06 | D = −6.85706e−08 |

The compensator that is the second movable lens unit is constituted by surfaces R1 to R4, and the variator is constituted by surfaces R6 to R10. The compensator corresponds to a first lens unit B1 disposed closest to an object. The variator corresponds to a second lens unit B2 disposed closer to the image plane IP than the first lens unit B1. A movable third lens unit B3 that is a focus lens as the first movable lens unit is disposed closer to the image plane IP than the second lens unit B2.

In the zoom lens of this embodiment, the aperture stop SP is disposed between the first lens unit B1 and the second lens unit B2, and a glass block G such as an optical filter is disposed closer to the image plane IP than the third lens unit B3.

Figure 12:
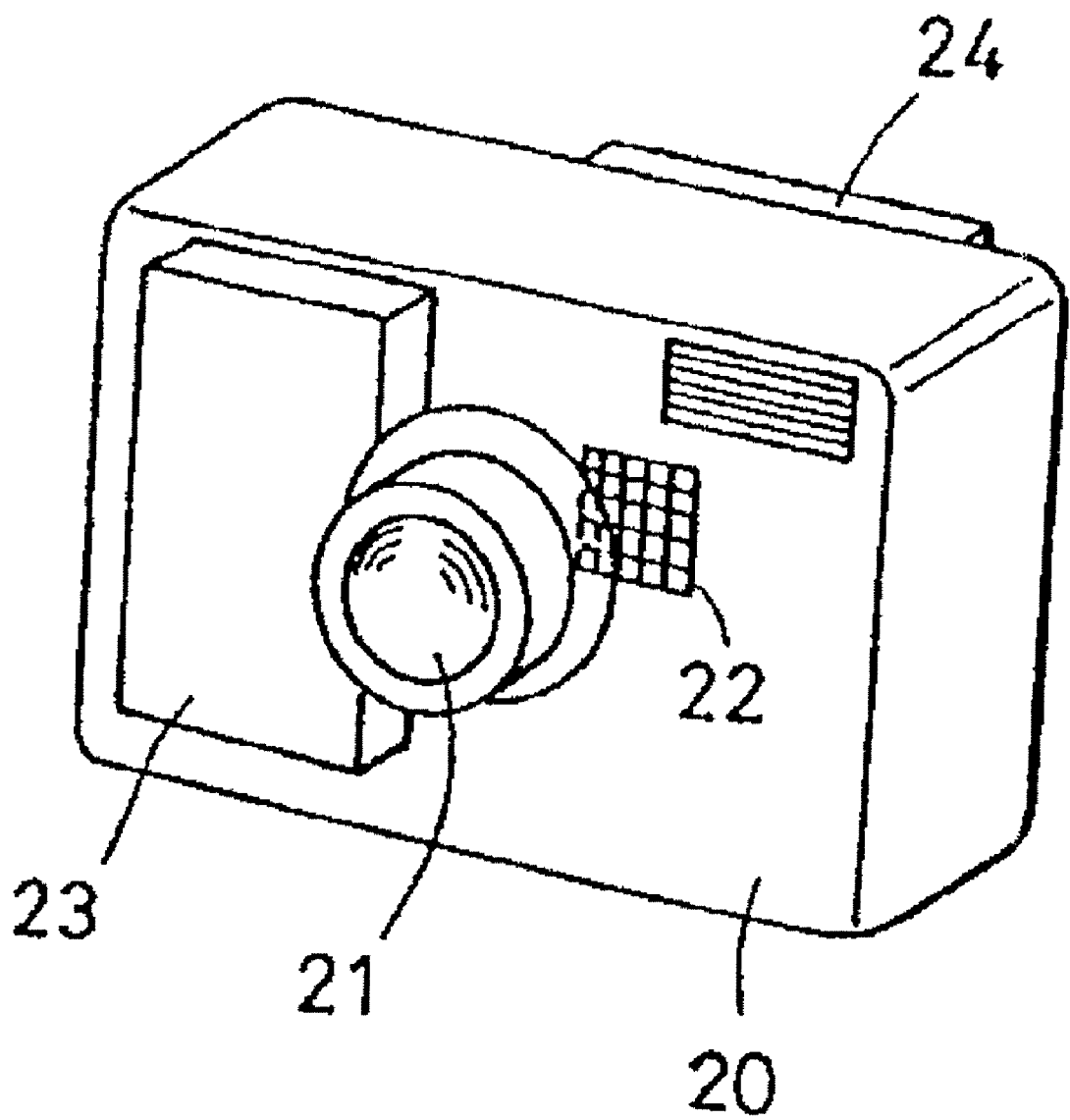
FIG. 12 is a schematic view of the digital still camera of Embodiments 1 to 4.

The zoom lens of this embodiment is used as an image-pickup optical system for a digital still camera (optical apparatus) shown in FIG. 12.

In FIG. 12, reference numeral 20 denotes a camera body, and 21 the image-pickup optical system as the zoom lens shown in FIG. 10.

Reference numeral 22 denotes an image-pickup element such as a CCD sensor or a CMOS sensor, which is incorporated in the camera body and photoelectrically converts an object image formed by the image-pickup optical system 21. Reference numeral 23 denotes a recording medium that stores image information corresponding to the object image photoelectrically converted by the image-pickup element 22, the recording medium being formed of a semiconductor memory. Reference numeral 24 denotes a display panel that is formed of a liquid crystal panel or the like and used for observation of the object image and display of the picked-up image.

Figure 11:
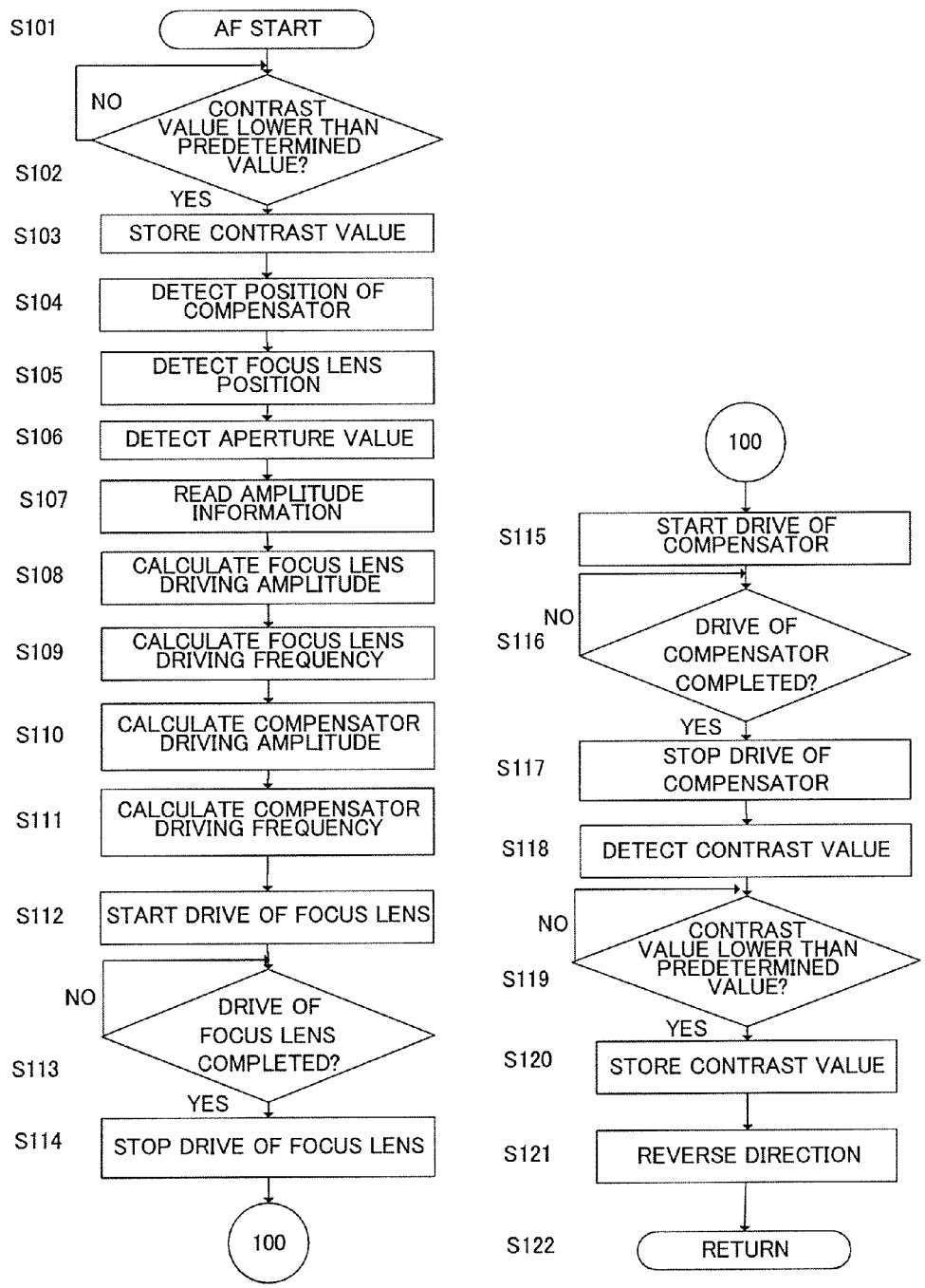
FIG. 11 is a flowchart showing operations of the digital still camera of Embodiment 5.

The AF control in this embodiment will be described below with reference to FIG. 11. This AF control is performed by the microcomputer 110 according to computer programs stored in its internal memory. Parts with the circled numeral '100' in FIG. 11 are connected to each other. Reference numeral 101 is assigned to the compensator as in Embodiment 1, but no reference numeral is assigned to the focus lens. The same reference numerals are assigned to the other components corresponding to those in Embodiment 1.

When the power of the video camera is turned on, the microcomputer 110 starts the AF control at step S101. The microcomputer 110 determines at step S102 whether or not the contrast value is lower than a predetermined value. If the contrast value is equal to or higher than the predetermined value, the microcomputer 110 regards the current focus state as an in-focus state without causing the compensator 101 to wobble and then repeats the determination of the contrast value. If the contrast value is lower than the predetermined value, the microcomputer 110 stores the contrast value into its internal RAM at step S103.

Next, the microcomputer 110 detects the position of the compensator 101 at step S104 and detects the position of the focus lens at step S105. Further, the microcomputer 110 detects the aperture value of the aperture stop 103 at step S106. These detected values are stored into the RAM.

At step S107, the microcomputer 110 reads from the memory 111 amplitude information for the compensator 101 and the focus lens according to the detected positions of the compensator 101 and focus lens. The amplitude information for the compensator 101 is a movement amount required to reduce the variation of the exit pupil position of the image-pickup optical system, the variation being caused by the wobbling of the focus lens.

At step S108, the microcomputer 110 calculates a driving amplitude amount of the focus lens from the read amplitude information. Then at step S109, the microcomputer 110 calculates a driving frequency of the focus lens.

Further, at step S110, the microcomputer 110 calculates a driving amplitude amount of the compensator 101 from the read amplitude information. Then at step S111, the microcomputer 110 calculates a driving frequency of the compensator 101.

At step S112, the microcomputer 110 starts drive of the focus lens of the driving amplitude amount thereof to one side of the optical axis direction. Then at step S113, the microcomputer 110 determines whether or not the drive of the focus lens of the driving amplitude amount has been completed. If the drive of the focus lens of the driving amplitude amount has not been completed, the microcomputer 110 repeats the determination. If the drive of the focus lens of the driving amplitude amount has been completed, the microcomputer 110 stops the drive of the focus lens at step S114.

At step S115, the microcomputer 110 starts drive of the compensator 101 of the driving amplitude amount thereof to one side of the optical axis direction. Then at step S116, the microcomputer 110 determines whether or not the drive of the compensator 101 of the driving amplitude amount has been completed. If the drive of the compensator 101 of the driving amplitude amount has not been completed, the microcomputer 110 repeats the determination. If the drive of the compensator 101 of the driving amplitude amount has been completed, the microcomputer 110 stops the drive of the compensator 101 at step S117.

Next, the microcomputer 110 reads the contrast value at step S118.

Then at step S119, the microcomputer 110 determines whether or not the contrast value is lower than the predetermined value. If the contrast value is equal to or higher than the predetermined value, the microcomputer 110 repeats the determination. If the contrast value is lower than the predetermined value, the microcomputer 110 stores the above contrast value at step S120 and then proceeds to step S121. At step S121, the microcomputer 110 reverses the driving direction of the focus lens, and then at step S122 the microcomputer 110 returns to step S112.

When the driving direction of the focus lens is reversed, the driving direction of the compensator 101 is also reversed.

Repeating the above-described processes enables the minute wobbling of the focus lens and the compensator 101 in the optical axis direction.

The microcomputer 110 compares the contrast values thus obtained in the respective routines to determine the direction (in-focus direction or information relating to the in-focus position) in which the contrast value increases.

After the determination of the in-focus direction, the microcomputer 110 causes the focus lens and the compensator 101 to move step by step with a predetermined amount in the in-focus direction, and then causes the focus lens and the compensator 101 to minutely wobble when the obtained contrast value becomes near the maximum value. At this time, the microcomputer 110 determines a center position of a range where the contrast value increases and decreases (information relating to the in-focus position) to define the center as the in-focus position.

When the in-focus state is thus obtained, the microcomputer 110 stops the drive of the focus lens and the compensator 101 and then returns to step S102 to continue the AF control.

According to this embodiment, a digital still camera having a small size and a high focusing performance and being capable of reducing the image twitching and the field angle variation can be realized.

The image-pickup optical systems described in Embodiments 1 to 4 may be used for the digital still camera shown in FIG. 12. The image-pickup optical system described in Embodiment 5 may be used for the video camera shown in Embodiment 1.

Further, an interchangeable lens (lens apparatus) that is an optical apparatus can be constituted by using the image-pickup optical systems described in Embodiments 1 to 5.

According to each of the above-described embodiments, in the optical apparatus provided with the image-pickup optical system that is a non-telecentric optical system, the image twitching and the field angle variation due to the variation of the exit pupil position can be reduced while achieving a reduction in size and a high focusing performance.

Moreover, in the optical apparatus provided with an optical system that makes the image visually undesirable when the contrast AF is performed, an improved image can be obtained in the contrast AF.

TABLE 5

| CONDITION | EMBODIMENT | | | |
|---|---|---|---|---|
| | 1 | 3 | 4 | 5 |
| (1) $|tk/L|$ | 7.04 | 8.27 | 6.11 | 2.68 |
| (2) $|tk/ftk|$ | 3.56 | 12.41 | 3.93 | 2.54 |
| (3) $|Esm|$ | 0.11 | 0.07 | 0.16 | 0.30 |

Furthermore, the present invention is not limited to these embodiments and various variations and modifications may be made without departing from the scope of the present invention.

This application claims foreign priority benefits based on Japanese Patent Application No. 2007-035506, filed on Feb. 15, 2007, which is hereby incorporated by reference herein in its entirety as if fully set forth herein.

What is claimed is:

1. An optical apparatus comprising:
an optical system including a first movable lens unit and a second movable lens unit that are independently movable in an optical axis direction; and
a controller causing the first movable lens unit to wobble in the optical axis direction based on contrast information generated from an image signal for obtaining information relating to an in-focus position,
wherein the optical system satisfies the following condition:

$$|tk/L|<15$$

where tk represents a distance from a position of an image plane of the optical system to a position of an exit pupil thereof when the position of the exit pupil is closest to the position of the image plane, L represents an effective diagonal length of an image at the position of the image plane, and
wherein the controller causes the second movable lens unit to wobble in the optical axis direction to reduce variation of the position of the exit pupil in association with the wobbling of the first movable lens unit.

2. The optical apparatus according to claim 1, wherein the optical system is a variable magnification optical system and satisfies the following condition:

$$|Esm|<0.5$$

where Esm represents a minimum value of a positional sensitivity of the first movable lens unit.

3. The optical apparatus according to claim 1, wherein the optical system is a variable magnification optical system, and
wherein the controller causes the second movable lens unit to wobble such that a ratio of a wobbling amount of the second movable lens unit to that of the first movable lens unit is fixed in an entire zoom range.

4. The optical apparatus according to claim 1, wherein the optical system is a variable magnification optical system, and wherein the controller causes the second movable lens unit to wobble such that a ratio of a wobbling amount of the second movable lens unit to that of the first movable lens unit is changed in accordance with a zoom state.

5. The optical apparatus according to claim 1, wherein the controller causes the wobbling of the second movable lens unit to start within 0.2 seconds from the start of the wobbling of the first movable lens unit.

6. The optical apparatus according to claim 1, wherein the optical system includes an aperture stop whose aperture value is variable, and wherein the controller causes the aperture value of the aperture stop to vary in association with the wobbling of the first movable lens unit.

7. The optical apparatus according to claim 1, wherein the optical system further satisfies the following condition:

$$|tk/ftk| < 15$$

where ftk represents a focal length of the optical system when the position of the exit pupil is closest to the position of the image plane.

* * * * *